Patented Dec. 15, 1942

2,305,035

UNITED STATES PATENT OFFICE 2,305,035

FIREPROOFING

Charles M. Rosser, Fredericksburg, Va., assignor to Sylvania Industrial Corporation, Fredericksburg, Va., a corporation of Virginia No Drawing. Application November 13, 1941, Serial No. 418,890

20 Claims. (Cl. 117—136)

The present invention relates to fireproofing. More particularly, it relates to fireproof articles in the form of flexible bodies such as sheets, films, tubes and filaments; to a composition for fireproofing such bodies, and to a process for fireproofing the bodies.

Articles formed from flexible materials, for example, sheets, films and filaments of regenerated cellulose are used extensively in the wrapping, packaging, textile and cordage arts and possess certain characteristics, such as brilliance, transparency and coloration, which make them desirable for use in theatrical, advertising and other decorative installations. However, the fact that these materials are inflammable to an extent which approaches that of fibrous paper has restricted their use in installations where the creation of a fire hazard is prohibited. Attempts have been made heretofore to render such articles fireproof but all of the fireproofing agents heretofore known have been marked by certain deficiencies such as prohibitively increasing the cost of the articles, remaining effective as fireproofing agents for a limited time only, creating only a slight fireproof effect, and/or varying the physical and visual characteristics of the articles so as to render the articles incapable of their intended use. Also, since such articles are frequently employed to package foodstuffs or come in contact with foodstuffs which are concentrated during storage or shipment in sufficient quantity to form a fire hazard, the fireproofing agent can not be toxic or have a disagreeable odor. This has further restricted the use of certain fireproofing materials.

It is an object of the present invention to provide a fireproof article which overcomes all of the foregoing difficulties.

It is another object of the present invention to provide a fireproof article having visual characteristics which are substantially the same as a similar article which does not have the fireproof characteristics.

It is also an object of the present invention to provide a fireproof article having substantially the same physical characteristics, other than the fireproof property, as a similar article which does not have the fireproof property.

It is a further object of the present invention to provide a fireproof transparent sheet which is flexible and does not become brittle with age.

It is also a further object of the present invention to provide a fireproofing composition for flexible bodies.

It is a still further object of the present invention to provide a process of fireproofing flexible bodies.

Other objects and advantages will be apparent to those skilled in the art from the following detailed description of what are now considered the preferred embodiments of the invention.

The article of the invention in general comprises a body, which is preferably formed of nonfibrous material, for example, regenerated cellulose, impregnated with a fireproofing composition comprising alkylolamine guanidine phosphate and preferably with a suitable plasticizer of which formamide is preferred.

The invention accordingly comprises the several steps and the relation of one or more of such steps with respect to each of the others, the article possessing the features, properties and the relation of elements, and the composition of matter possessing the characteristics, properties and the relation of components, all as exemplified in the following detailed disclosure and the scope of the invention will be indicated in the claims.

It has been found that when an alkylolamine guanidine phosphate has been applied to an article such, for example, as a sheet, tubing or filament of regenerated cellulose, the article will flame only when an independent flame or incandescent body is placed in direct contact with an uncharred portion of the article. Even when a direct flame or incandescent body is held in contact with one portion of such an article, flaming and charring will not continue after the area covered by and immediately surrounding the flame becomes charred, and there is no afterglow upon removal of the flame. Furthermore, the article cannot be caused to flame by a nonincandescent body such as an overheated electrical fixture or the like. The article cannot, therefore, propagate flame but, on the contrary, tends to extinguish small flames such as matches and lighted cigarettes. It therefore follows that the possibilities of fire loss from the usual sources of accidental conflagration are not only not increased but are actually reduced by the article of the present invention.

The article of the present invention does not discolor upon aging and the alkylolamine guanidine phosphate does not crystallize on the surface of the sheet. Furthermore, the alkylolamine guanidine phosphate serves to some extent as a plasticizer for the sheet and thereby not only does not increase but actually prohibits embrittlement as the sheet ages.

Practically any desired material may be fireproofed by the composition of the present invention. For example, the following materials may be mentioned: paper, textile fabrics, composition board, and nonfibrous materials such as cellulose hydrate regenerated from viscose, cuprammonium solutions of cellulose, solutions of cellulose in other inorganic solvents as well as organic solvents such as quaternary ammonium compounds, or obtained by deesterification of cellulose esters, or from any other desired source; cellulose esters, cellulose ethers and other nonfibrous materials. The fireproofing composition of the present invention is, however, peculiarly adapted for use in fireproofing hydrophilic cellulosic materials because it meets all of the requirements necessary to form a good fireproofing agent for this material which is unusually difficult to fireproof. That is, alkylolamine guanidine phosphates when employed as fireproofing compositions for hydrophilic cellulosic material do not discolor the material, do not embrittle it, do not reduce its transparency, do not crystallize on the surface, and are stable in the presence of the moisture present in such materials.

The alkylolamine guanidine phosphates as a class may be used in the practice of the present invention and the following members of this class are given merely by way of exemplification: monoethanolamine guanidine phosphate, diethanolamine guanidine phosphate, n-butyl-diethanolamine guanidine phosphate, n-propyl-diethanolamine guanidine phosphate, n-ethyl-diethanolamine guanidine phosphate, butanolamine guanidine phosphate, butandiolamine guanidine phosphate, butantriolamine guanidine phosphate, and triethanolamine guanidine phosphate. The pyrophosphates may of course be used as well as the phosphates, and the phosphates and pyrophosphates are to be understood as including hydrogen and dihydrogen phosphate and pyrophosphate, respectively.

Although the alkylolamine guanidine phosphates as a class are capable of use in the practice of the present invention, from some aspects of the invention, diethanolamine guanidine phosphate is preferred. This is possibly due to the fact that the relationship between the number of carbon atoms and the number of amino nitrogen atoms present in this substance appears to be optimum for a composition capable of producing high fireproofing effects and at the same time producing practically no undesirable effects. Also, the acidity of the composition appears to be proper to prevent any embrittlement of the sheet and the fireproofing action is permanent.

For the purpose of explanation and not by way of limitation of the invention, it will be described in connection with the employment of diethanolamine guanidine phosphate. The diethanolamine guanidine phosphate may be prepared in any desired manner. As an illustration of one manner in which this fireproofing agent may be prepared, the following example will be given, but it is to be understood that the invention is not to be construed as being limited to this manner of preparation and application:

15 grams of ortho-phosphoric acid ($H_3PO_4$), which may be obtained by the use of 20 grams of a 75 per cent acid solution, are suitably mixed with 9 grams of guanidine, which may be obtained by the use of 12 grams of guanidine carbonate. These substances react with the elimination of carbon dioxide to give guanidine di-hydrogen phosphate. Five grams of diethanolamine are added to this guanidine phosphate and the solution is diluted with 300 c.c. of water. The diethanolamine guanidine phosphate bath thus formed contains approximately 9 per cent solids and will have a pH value of approximately 6, which is sufficiently neutral for use in fireproofing a body of regenerated cellulose, for example, a sheet of Cellophane.

The article to be fireproofed, for example, a sheet of Cellophane, is passed in contact with the bath formed as above for a sufficient time to permit the solution of diethanolamine guanidine phosphate to thoroughly wet and penetrate the sheet, for example, from one-half to one and one-half minutes at a slightly elevated temperature, for example 40° C.

When fireproofing materials which are formed in a continuous length, for example, sheets, tubing or filaments formed of regenerated cellulose, the fireproofing step can be advantageously performed as the last step in the forming operations before the drying operation. In this manner, the fireproof characteristic is imparted to the article without reducing the speed of production of the article and additional handling steps are avoided.

Although the diethanolamine guanidine phosphate, in addition to acting as a fireproofing agent, serves to some extent as a plasticizer, it is usually desirable, particularly when the articles are to be subjected to somewhat elevated temperatures, or used in dry climates, to further plasticize the article. Glycerine and other polyhydric alcoholic materials which are usually used as plasticizers for regenerated cellulose and the like nonfibrous articles cannot be used in sufficient quantities to produce adequate plasticization because they make it impossible to produce a fireproof material. It has been found that formamide functions as an efficient plasticizer for nonfibrous materials, for example, regenerated cellulose, and at the same time does not impair the fireproofing function of the fireproofing agent, but, on the contrary, acts itself to some extent as a fireproofing agent. This may be due to the fact that formamide comprises approximately 37 per cent ammonia, which is liberated upon burning of the formamide and acts as a flame retardant. Also, the formamide does not form a sticky surface on the sheet, does not impair the transparency of the sheet, and acts as a buffer to prevent rising acidity within the sheet upon aging.

The formamide may be added directly to the solution of alkylolamine guanidine phosphate through which the sheet is passed, and in this manner the fireproofing and plasticizing steps are combined which avoids a multiplicity of operations.

In the practice of the present invention by following the example previously given the following range of ingredients may be employed to form the fireproofing and/or plasticizing bath.

| | Grams |
|---|---|
| Acid of phosphorous | 5 to 20 |
| Guanidine | 2 to 18 |
| Diethanolamine | 1 to 12 |
| Formamide | Up to 12 |

The acid of phosphorous employed to produce the diethanolamine guanidine phosphate may be either the orthophosphoric acid ($H_3PO_4$) as described above, the pyrophosphoric acid ($H_4P_2O_7$), the hypophosphoric acide ($H_4P_2O_6$), the hypophosphorous acid ($H_3PO_2$), or the phosphorous acid ($H_3PO_3$).

If desired, sodium alginate may be added to the fireproof article as a precaution against crystallization of the fireproofing agent under extreme climatic conditions. The sodium alginate may be added in any desired amount, preferably from 0.3 per cent to 0.5 per cent based on the solids in the fireproofing bath, exclusive of any plasticizer, and the sodium alginate may be applied to the sheet in the same bath as the fireproofing agent and the plasticizer.

It is preferable that the pellicle be treated with the fireproofing agent in accordance with the present invention while in the wet gel state. It may be so treated just prior to drying following the initial formation, or may be so treated after being soaked in water for a sufficient length of time for the pellicle to become swollen subsequent to having once been dried. If desired, a suitable wetting agent may be used in the water bath for rewetting the pellicles, for example, tergitol, aerosol, monopole oil, or any other well-known wetting agent. The wetting agent may be washed out of the pellicle before treatment with the fireproofing agent if desired.

The process and composition of the present invention have made it possible to utilize materials, for example, non-fibrous hydrophilic cellulosic materials, for many industrial applications where inflammable materials cannot be used, for example, electrical insulation and other protective coverings. In addition, the process and composition of the present invention have made it possible to extend the uses of such materials for decorative purposes, since the articles of the present invention can be used to advantage in the production of stage settings, theatrical costume production, department store decorations and in other capacities where inflammability cannot be tolerated.

The term "fireproof" as used throughout this specification and the claims is to be understood as including "flameproof."

Since certain changes in carrying out the above process and certain modifications in the composition and the article which embody the invention may be made without departing from their scope, it is intended that all matter contained in the above description shall be interpreted as illustrative and not in a limiting sense.

The invention having been described, what is claimed is:

1. As an article of manufacture, a flammable material having incorporated therein an alkylolamine guanidine phosphate in sufficient quantity to render the material fireproof.

2. As an article of manufacture, a fibrous organic flammable material having incorporated therein an alkylolamine guanidine phosphate in sufficient quantity to render the material fireproof.

3. As an article of manufacture, a nonfibrous organic flammable material having incorporated therein an alkylolamine guanidine phosphate in sufficient quantity to render the material fireproof.

4. As an article of manufacture, an organic hydrophilic flammable material having incorporated therein an alkylolamine guanidine phosphate in sufficient quantity to render the material fireproof.

5. As an article of manufacture, a flammable material comprising regenerated cellulose having incorporated therein an alkylolamine guanidine phosphate in sufficient quantity to render the material fireproof.

6. As an article of manufacture, a flammable material comprising regenerated cellulose having incorporated therein an alkylolamine guanidine phosphate and formamide in sufficient quantity to render the material fireproof.

7. As an article of manufacture, a flammable material comprising regenerated cellulose having incorporated therein an alkylolamine guanidine phosphate and sodium alginate in sufficient quantity to render the material fireproof.

8. As an article of manufacture, an organic hydrophilic flammable material having incorporated therein diethanolamine guanidine phosphate in sufficient quantity to render the material fireproof.

9. As an article of manufacture, a flammable material comprising regenerated cellulose having incorporated therein diethanolamine guanidine phosphate in sufficient quantity to render the material fireproof.

10. As an article of manufacture, a flammable material comprising regenerated cellulose having incorporated therein monoethanolamine guanidine phosphate in sufficient quantity to render the material fireproof.

11. As an article of manufacture, a flammable material comprising regenerated cellulose having incorporated therein butandiolamine guanidine phosphate in sufficient quantity to render the material fireproof.

12. The process of producing a fireproof article comprising passing a body of flammable material through a bath comprising an alkylolamine guanidine phosphate and drying the excess moisture from the body.

13. The process of producing a fireproof article comprising passing a sheet of fibrous organic flammable material through an aqueous solution comprising an alkylolamine guanidine phosphate and drying the excess moisture from the sheet.

14. The process of producing a fireproof article comprising passing a sheet of organic hydrophilic flammable material through an aqueous solution comprising an alkylalomine guanidine phosphate and drying the excess moisture from the sheet.

15. The process of producing a fireproof article comprising passing a sheet of regenerated cellulose in the gel state through an aqueous solution comprising alkylolamine guanidine phosphate and drying the excess moisture from the sheet.

16. The process of producing a fireproof article comprising immersing a body of organic hydrophilic material in the wet gel state in an aqueous solution comprising an alkylolamine guanidine phosphate for sufficient time for the solution to thoroughly impregnate the body, removing the body from the solution and drying the excess moisture therefrom.

17. The process of producing a fireproof article comprising immersing a body of regenerated cellulose in the wet gel state in an aqueous solution comprising an alkylolamine guanidine phosphate for sufficient time for the solution to thoroughly impregnate the body, removing the body from the solution and drying the excess moisture therefrom.

18. The process of producing a fireproof article comprising immersing a body of regenerated cellulose in the wet gel state in an aqueous solution comprising diethanolamine guanidine phosphate for sufficient time for the solution to thoroughly impregnate the body, removing the body from the solution and drying the excess moisture therefrom.

19. The process of producing a fireproof article comprising immersing a body of regenerated cellulose in the wet gel state in an aqueous solution comprising diethanolamine guanidine phosphate and formamide for sufficient time for the solution to thoroughly impregnate the body, removing the body from the solution and drying the excess moisture therefrom.

20. The process of producing a fireproof article comprising immersing a body of regenerated cellulose in the wet gel state in an aqueous solution comprising diethanolamine guanidine phosphate and sodium alginate for sufficient time for the solution to thoroughly impregnate the body, removing the body from the solution and drying the excess moisture therefrom.

CHARLES M. ROSSER.